United States Patent [19]

Bächli

[11] 4,153,103
[45] May 8, 1979

[54] VACUUM TANK

[76] Inventor: Emil Bächli, Hauptstrasse 156, 5340 Endingen, Aargau, Switzerland

[21] Appl. No.: 844,529

[22] Filed: Oct. 25, 1977

[30] Foreign Application Priority Data

Aug. 16, 1977 [CH] Switzerland ............... 010121/77

[51] Int. Cl.² ........................................... F24H 3/00
[52] U.S. Cl. ................................... 165/47; 52/269; 220/420
[58] Field of Search ............... 165/47; 220/420, 421, 220/422, 423, 424; 52/169.6, 169.7, 249, 269

[56] References Cited

U.S. PATENT DOCUMENTS 3,151,416  10/1964  Eakin et al. ................ 52/169.6 X
3,454,080  7/1969   Künzli ........................... 165/47
3,559,835  2/1971   Lange ........................... 220/422
3,712,012  1/1973   Meyer et al. .................... 52/249

Primary Examiner—Edgar W. Geoghegan
Attorney, Agent, or Firm—Werner W. Kleeman

[57] ABSTRACT

A vacuum tank or the like, especially for the storage of heat for a long period of time, comprising an outer pressure shell and an inner shell having an evacuated intermediate space. The pressure shell is formed of concrete and equipped with a metal covering bearing thereagainst. Support elements or anchoring means arranged at the metal covering are anchored in the pressure shell. The inner shell is formed of a compression resistant material.

7 Claims, 8 Drawing Figures

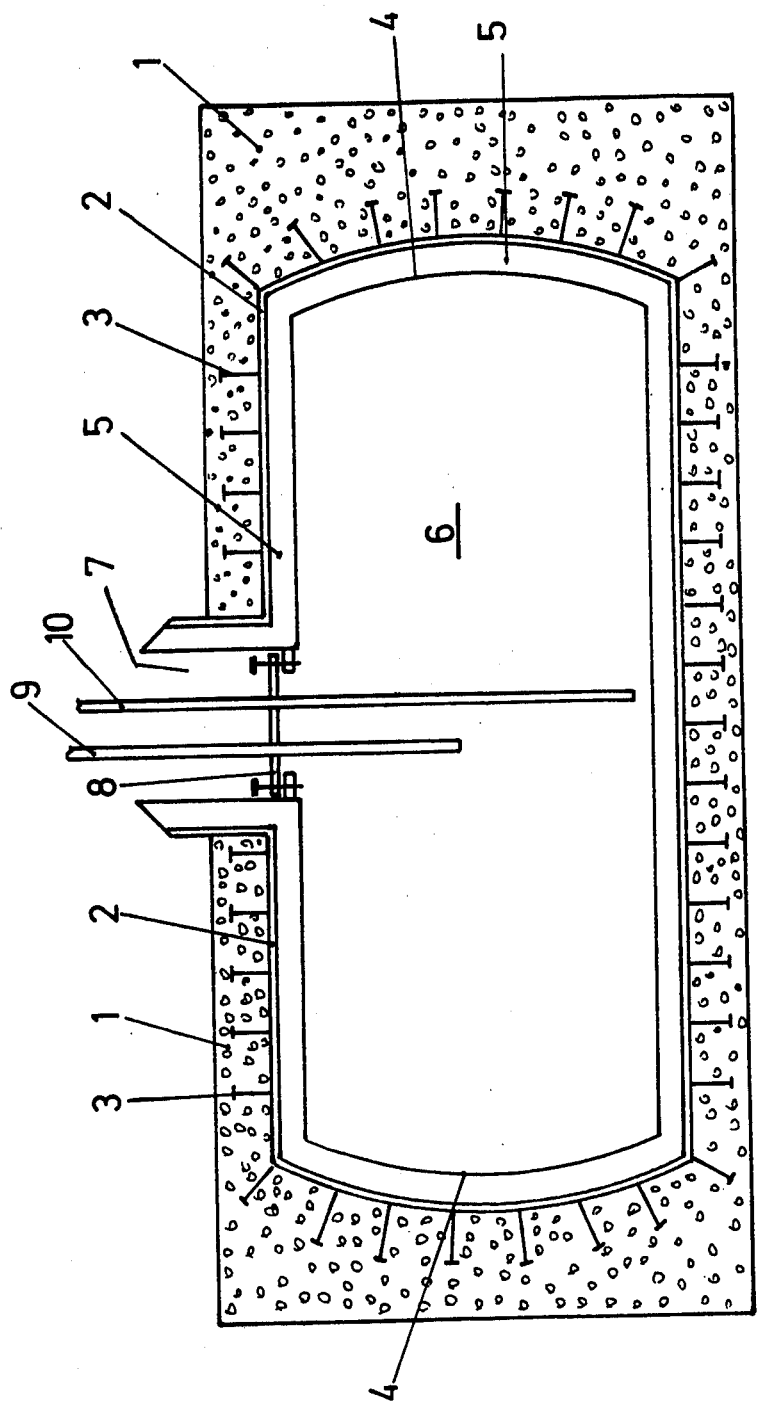

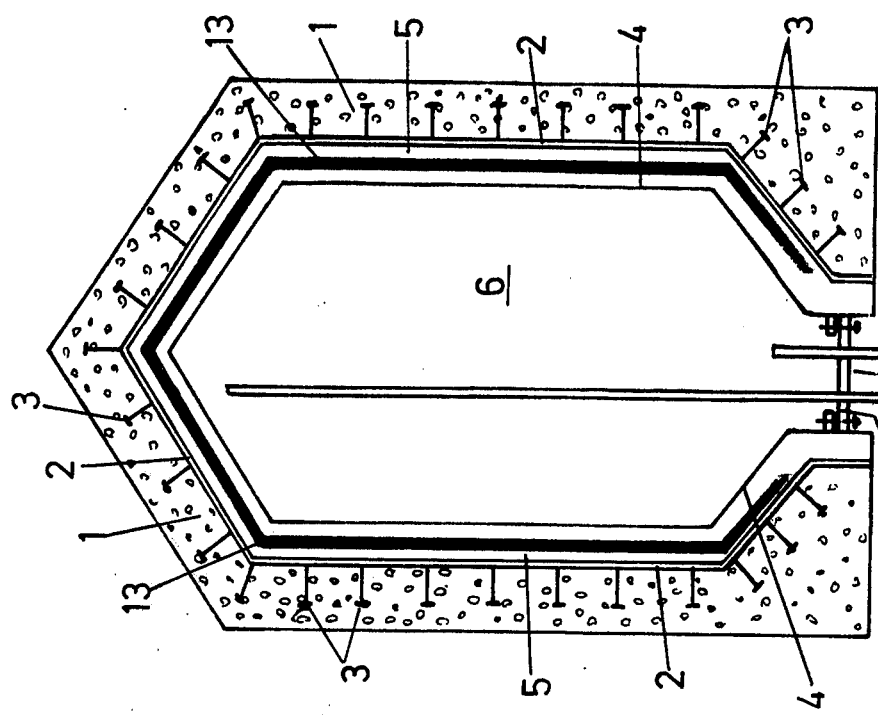
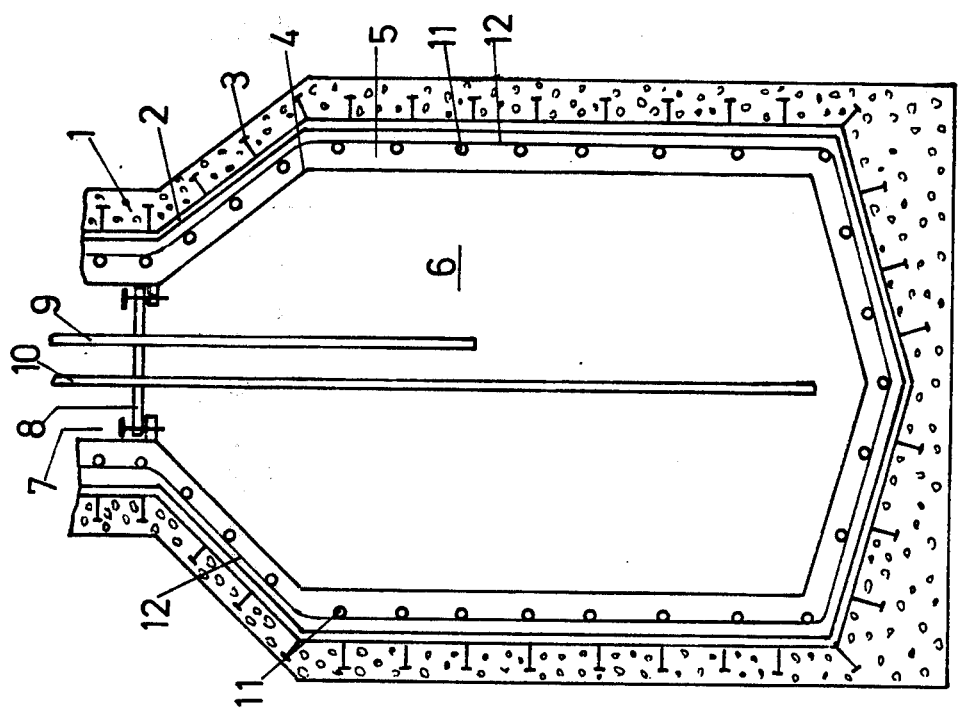

VACUUM TANK

BACKGROUND OF THE INVENTION

The present invention relates to a new and improved construction of a vacuum tank or vessel, especially for the storage of heat for a long period of time, which is of the type comprising an outer pressure shell and an inner shell having an evacuated intermediate space or chamber.

In order to store thermal energy over a longer time span there was heretofore employed different systems. Thus, in consideration of the beneficial utilization of solar energy there has increasingly become more actual the problem of storing thermal energy, especially the storage of heat over a longer period of time, since it is just during those seasons of the year where the requirement for heat is most prevalent, for instance in the winter, that the solar radiation is not always available. Therefore, there have previously come into use different systems, for instance employing subterranean storage installations. Thus, there have been employed caverns, and specifically in different ways, either in that existing caverns are sealed towards their top and equipped with infeed conduits or lines, or that there were applied metal linings or coverings. These installations are, however, quite complicated and expensive and only then can be used where the ground conditions permit the use of these techniques without having to rely upon additional complicated constructional measures.

A further possibility resides in the use of vacuum technology. When using this technique it is possible to obtain high insulation values, in a manner not even realizable under other conditions with very thick layers of insulation material.

In order to obtain such outstanding insulation values there are required vacuum tanks or vessels. These were heretofore fabricated for a considerable time from steel or materials which did not possess any porosity, preferably from high grade steel. Such type vacuum tanks must, of course, possess an extremely large wall thickness, so as to ensure they are not crushed or collapsed by the external atmospheric pressure. Due to the constructional expenditures and the high material costs such type tanks are much too complicated and expensive for large heat storage installations and also even for smaller heat storage installations, such as are utilized for instance in apartment buildings and other residential structures.

SUMMARY OF THE INVENTION

Hence, with the foregoing in mind it is a primary object of the present invention to provide an improved construction of vacuum tank or the like which is not associated with the aforementioned drawbacks and limitations of the prior art proposals.

Another and more specific object of the invention aims at the provision of a new and improved construction of an insulated tank or the like for the storage of thermal energy for long periods of time, which tank is relatively simple in construction and design, economical to manufacture and has very low heat losses.

Now in order to implement these and still further objects of the invention, which will become more readily apparent as the description proceeds, the vacuum tank or vessel of the present development is manifested by the features that the pressure shell is formed of concrete and equipped with a metal covering bearing thereat. Support elements or anchoring means arranged at the metal covering are anchored in the pressure shell. Further, the inner shell is formed of a pressure-resistant or compression-resistant material.

One notable advantage of the inventive structure particularly resides in the fact that the outer wall of the pressure shell or casing consists of concrete which can be easily fabricated in a molding process and easily accommodated to local conditions. The metal covering which bears against the pressure shell formed of concrete, and which simultaneously constitutes a gastight layer, preferably can be formed of steel sheet or chromium steel sheet or plate and is connected with the pressure shell by bolts or other suitable fastening expedients, so that there is realized a firm connection between the pressure shell and the metal covering. However, there is afforded the possibility of also adhesively bonding the metal covering by approppriate adhesive bonding techniques to the outer concrete-pressure shell. Due to the intimate interconnection of the metal covering with the pressure shell there is achieved the beneficial result that the entire external atmospheric pressure acting upon the vacuum tank or vessel, which amounts to about 10 tons per $m^2$ of pressure shell, can be absorbed thereby, whereas the inner layer, i.e., the metal covering only has the function of sealing the inner space or chamber.

According to a further preferred embodiment of the invention there are provided between the pressure shell and the inner shell heat-reflecting means.

Such type construction renders possible in a very simple manner an additional thermal insulation and prevents any radiation of the stored heat out of the inner space or chamber.

Furthermore, it is possible to provide at the heat-reflecting means which are arranged between the pressure shell and the inner shell, fluid-conducting coils of pipe or tubing for the removal of radiant heat.

In this way it is possible to equally make use of possible thermal losses, which are radiated towards the outside, by means of the fluid-conducting coils of pipe.

Additionally, it is advantageous to provide as the anchoring means or support elements between the metal covering and the pressure shell pre-formed reinforcing steel and to shape or profile the metal covering in order to increase the strength.

The use of pre-formed reinforcing steel as the anchoring means between the inner metal covering and the outer pressure shell is recommended in all those situations where the tank constitutes a larger size vessel or container, since the pre-formed reinforcing steel can be placed upon the outer surface of the metal covering and be easily welded by spot welding machines or equivalent structure with such metal covering.

Further, it can be advantageous if there is provided between the pressure shell and the metal covering an insulating layer and for the transport of the tank to provide over its entire length uniformly distributed reinforcement elements.

The insulation layer between the pressure shell and the metal covering has the beneficial result that during annealing of the metal covering, in the event there is required degasification thereof, no heat reaches the pressure shell.

The arrangement of reinforcement elements over the entire length of the tank or vessel is recommended in all those instances where the tank is pre-fabricated and must be transported to a predetermined site. With the arrangement of the reinforcement elements it is possible to take into account whether the tank is to be transported or erected in horizontal or vertical position.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a cross-sectional view through a first exemplary embodiment of a heat storage structure or device in the form of a vacuum tank or vessel for the storage of heat over long periods of time;

FIG. 2 is a cross-sectional view of a further embodiment of a heat storage device in the form of a vacuum tank or vessel with coils of pipe arranged thereat;

FIG. 3 illustrates a further embodiment of a heat storage device in the form of a vacuum tank or vessel having reflector foils and an opening at the bottom thereof;

DETAILED DESCRIPTION OF THE PREFERRED EMBODIMENTS

Figure 4:
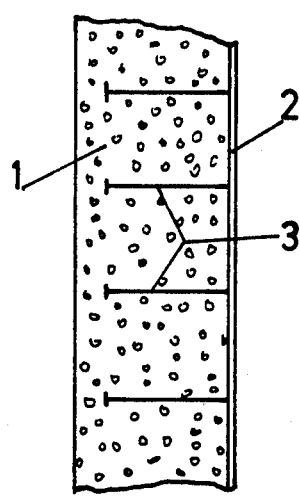
FIGS. 4, 5, 6 and 7 illustrate in respective fragmentary sectional views different possible constructions of the pressure shell of the vaacuum tank or vessel.

Describing now the drawings, it is to be understood that throughout the various embodiments there have been generally conveniently used essentially the same reference characters to denote the same or analogous components. Turning attention therefore to the vacuum tank or vessel shown by way of example in FIG. 1, it is to be understood that reference character 1 designates a pressure shell or casing which is preferably formed of concrete. At the inner surface of the pressure shell 1 there is attached a metal covering or lining 2 which tightly bears thereat, preferably formed of steel or chromium steel, by means of support or attachment elements 3 which are anchored at the pressure shell 1. However, it is also possible to anchor the metal covering 2 at the pressure shell 1 by means of a suitable adhesive or similar attachment techniques. In spaced relation from the metal covering 2 there is arranged an inner shell or casing 4 formed of a suitable pressure-resistant or compression-resistant material, such as for instance steel, high grade steel, aluminum, although other appropriate gastight or gas impervious materials can be employed. Between the inner shell 4 and the metal covering 2 there is provided an evacuated space or chamber 5. The pressure shell 1 together with the metal covering 2 and the inner shell 4 thus form an enclosed tank compartment 6 having an opening 7 which can be closed by a threadable cover member 8 or equivalent structure which snugly bears at the tank structure. The metal covering 2 and the inner shell 4 are preferably tightly connected with one another at the opening 7 of the tank compartment or chamber 6, preferably welded to one another, so that the vacuum is maintained within the evacuated space or chamber 5. In order to fill the storage medium there is provided at the cover member 8 a filling tube or pipe 9 and for the removal of the storage medium a removal tube or pipe 10. It is also readily possible to accomplish the infeed and/or removal of the storage medium by means of not particularly illustrated switching valves arranged externally of the heat storage tank or vessel.

Continuing, the embodiment of tank or vessel 1 illustrated in FIG. 2 is constructed analogous to the vacuum tank or vessel of the embodiment of FIG. 1, however here there are provided between the metal covering 2 and the inner shell 4 fluid-conducting coils of pipe or tubing 11 which additionally are covered by heat-reflecting means 12, for instance reflecting foils 13. The fluid-conducting pipe coils 11, together with the heat-reflecting means 12, render possible the utilization of thermal energy i.e., the removal of thermal energy from the residual heat which has penetrated through the inner shell 4 into the evacuated space or chamber 5. It is possible to connect the fluid-conducting pipe coils 11 with the infeed pipe 9 by means of a not particularly illustrated valve such that the heated-up fluid medium located in the fluid-conducting pipe coils 11 can be introduced into the heat circulation system of the storage medium.

The vacuum tank or vessel 1 illustrated in FIG. 3 is likewise constructed analogous to the embodiments of FIGS. 1 and 2, but in this case the opening 7 is located at the underside of such tank or vessel. Between the inner shell 4 and the metal covering 2 there is provided a heat-reflecting foil 13 or the like, preferably an aluminum foil or another suitable well known material adequate for this purpose.

In FIGS. 4, 5, 6 and 7 there are respectively illustrated different possible constructions of the pressure shell 1, and specifically with the metal covering or lining 2 which is attached in sealing relationship thereat. As best seen by referring to FIG. 4, the pressure shell 1, preferably composed of concrete, is covered at the surface confronting the inside of the tank with the metal covering 2, specifically in such a manner that the metal covering 2 is tightly connected with the concrete. This can be achieved in that anchoring or support elements 3 are welded at the metal covering 2 and cast into the material of the pressure shell 1, for instance into the concrete thereof.

Figure 5:
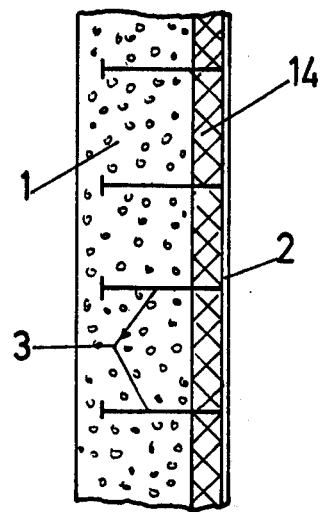

In the modified construction of FIG. 5 there is arranged between the pressure shell 1 and the metal covering 2 an additional insulating layer 14 which is preferably formed of a heat insulating material.

Figure 6:
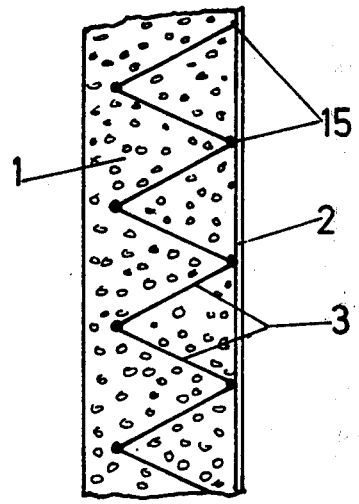

A still further possible construction of the pressure shell 1 together with the metal covering 2 and the anchoring elements or support means 3 has been shown in FIG. 6. With this modified embodiment the anchoring elements 3 are preferably formed of reinforcing iron for concrete and which is pre-shaped in a zig-zag configuraton, and wherein the locations directed towards the inner surface or inside of the tank or vessel are secured by means of spot welds 15 at the metal covering 2.

Figure 7:
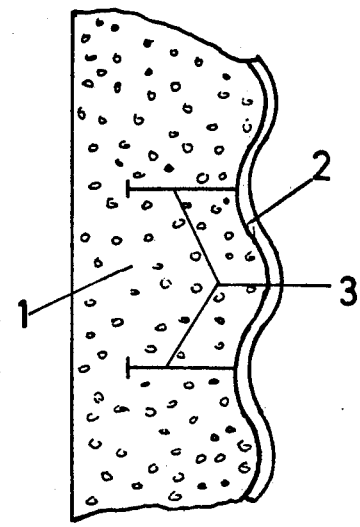

In order to be able to get by with reduced wall thickness of the tanks, it is permissible to construct the pressure shell 1 and the metal covering 2 according to the embodiment of FIG. 7. Here the metal covering 2 is a shaped or profiled structure, and the anchoring elements 3 likewise are attached at the metal covering 2, preferably at the profiled locations which are directed or arched towards the outside.

Figure 8:
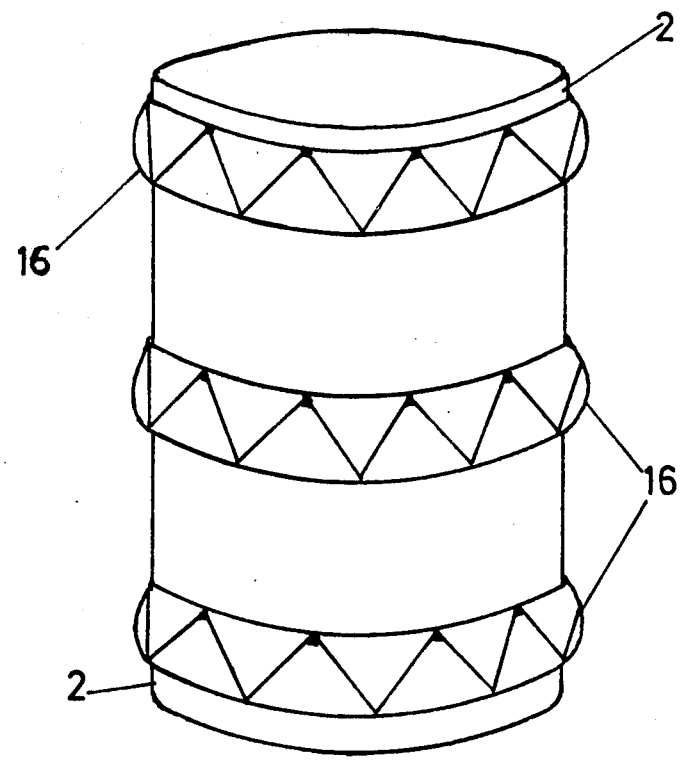
FIG. 8 is a perspective view of a vacuum tank or vessel provided with substantially ring-shaped reinforcement elements.

FIG. 8 illustrates a perspective outside view of the insulated tank at which there are arranged over the entire length of the tank uniformly distributed reinforcement elements 16, preferably serving for transport purposes. These reinforcement elements 16 are cast in the fabrication condition of the tank into the concrete of the pressure shell 1 and there can be mounted at the reinforcement elements 16 not particularly illustrated suspension eyelets for transport purposes. The reinforcement elements 16 are likewise preferably spot welded at the metal covering 2.

The inventive subject matter is not in any way limited to the vacuum tanks or vessels shown by way of example in the drawings. Thus, for instance, a vacuum tank or vessel can be produced whose pressure shell 1 and the metal covering 2 only consists of both of these components, and the entire inner space can serve as a vacuum tank or vessel, as such type vessels are already employed for metal vapor deposition, for degasification and for vacuum treatment of different devices, especially transformers or windings of electrical machines. The advantage of the inventive construction, in contrast to the heretofore known vacuum tanks, resides especially in terms of the simple and inexpensive manner of manufacturing such type tanks or vessels. Especially at those locations where such type tanks are employed in a stationary condition, the inventive construction is especially attractive.

Furthermore, it is possible, especially with large constructions of vacuum tanks or vessels, to provide the inner shell opposite the pressure shell with support elements and/or suspension means.

In the case of heat storage installations it is recommended to equip such type support or anchoring means with fluid-conducting pipe coils or the like, in order to beneficially reclaim any possibly dissipated heat.

Furthermore, it is possible to employ, instead of concrete, for fabricating the pressure shell any other compression-resistant material, for instance glass fiber reinforced or plain synthetic resin mixtures.

While there are shown and described present preferred embodiments of the invention, it is to be distinctly understood that the invention is not limited thereto, but may be otherwise variously embodied and practiced within the scope of the following claims. Accordingly,

What I claim is:

1. A vacuum tank, especially for the storage of heat over a long period of time, comprising:
    an outer pressure shell;
    an inner shell spaced from said outer pressure shell;
    said outer pressure shell and said spaced inner shell forming therebetween a permanently evacuated intermediate space;
    said pressure shell being formed of concrete:
    a metal covering tightly bearing at the pressure shell;
    support means for the metal covering and anchored in the pressure shell; and
    said inner shell being formed of a compression-resistant material.

2. The vacuum tank as defined in claim 1, further including:
    heat-reflecting means arranged between the pressure shell and the inner shell.

3. The vacuum tank as defined in claim 1, further including:
    heat-reflecting means arranged between the pressure shell and the inner shell;
    fluid-conducting pipe coils provided for the heat-reflecting means for the removal of radiant heat.

4. The vacuum tank as defined in claim 1, wherein:
    said support means comprise anchoring elements arranged between the metal covering and the pressure shell and constituted by pre-formed reinforcing steel elements.

5. The vacuum tank as defined in claim 1, wherein:
    said metal covering comprises profiled structure for increasing the strength thereof.

6. The vacuum tank as defined in claim 1, further including:
    an insulating layer disposed between the pressure shell and the metal covering.

7. The vacuum tank as defined in claim 5, further including:
    an insulating layer disposed between the pressure shell and the metal covering; and
    reinforcement means uniformly distributed over the entire length of the tank for facilitating transport thereof.

* * * * *